Aug. 22, 1950 — L. C. HAGG — 2,519,564
TRAILER DOLLY
Filed Oct. 20, 1947 — 3 Sheets-Sheet 1
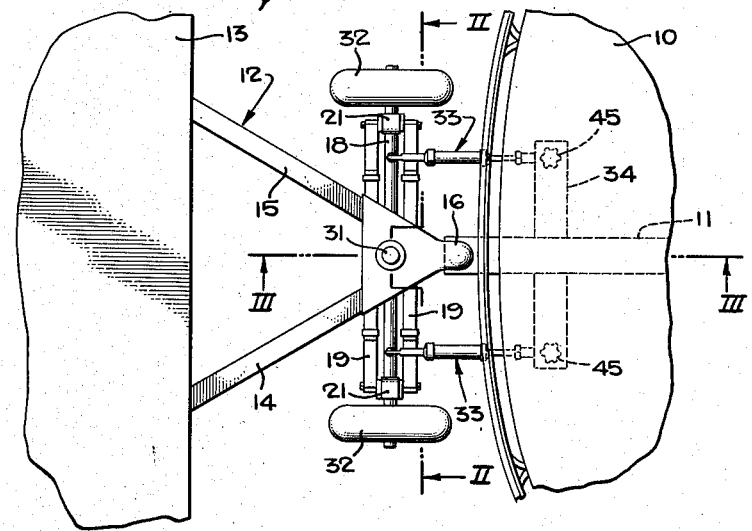
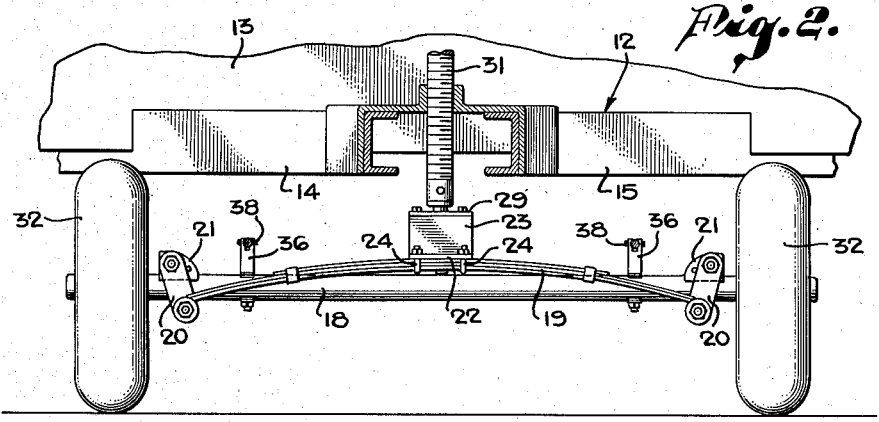
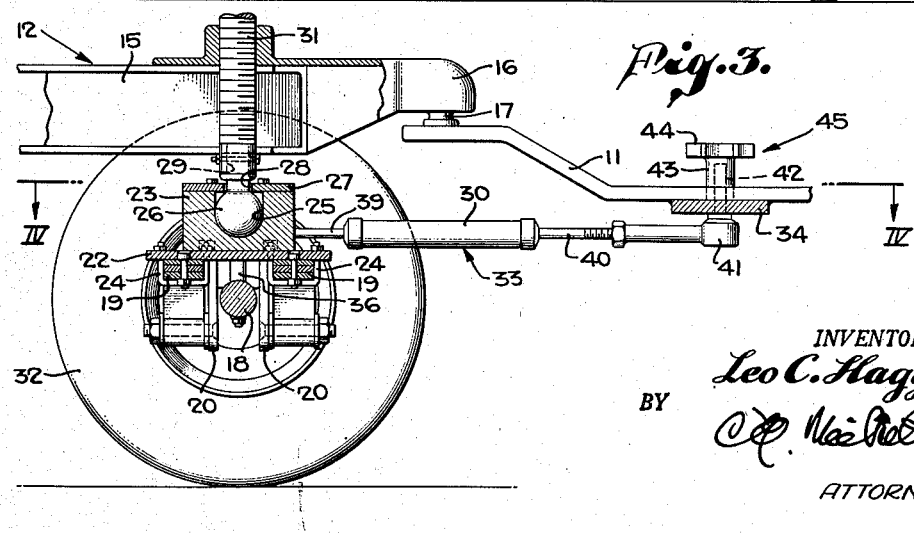
INVENTOR.
Leo C. Hagg
BY
ATTORNEY Aug. 22, 1950          L. C. HAGG          2,519,564
TRAILER DOLLY
Filed Oct. 20, 1947          3 Sheets-Sheet 2
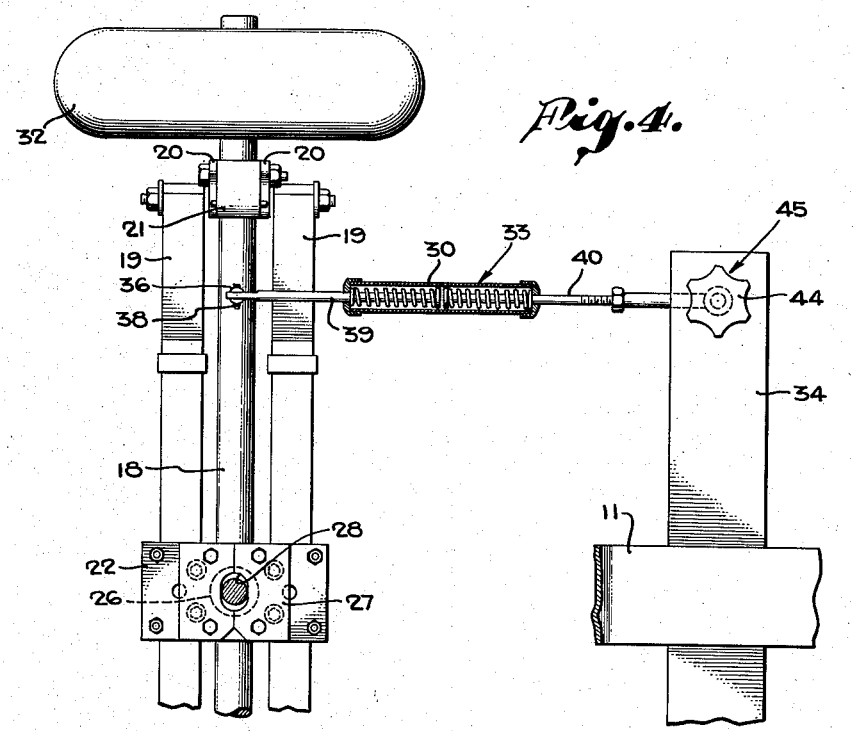
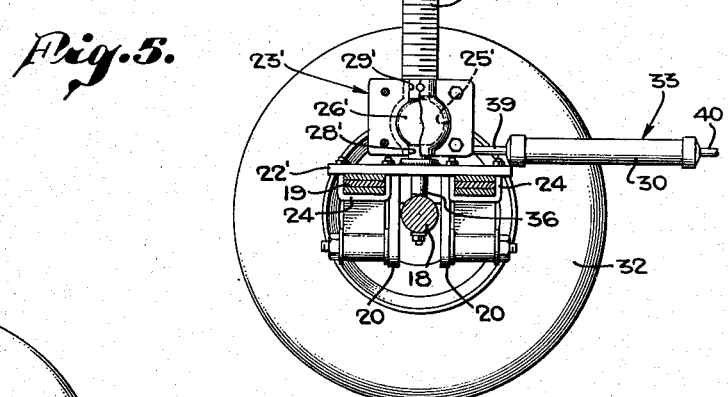
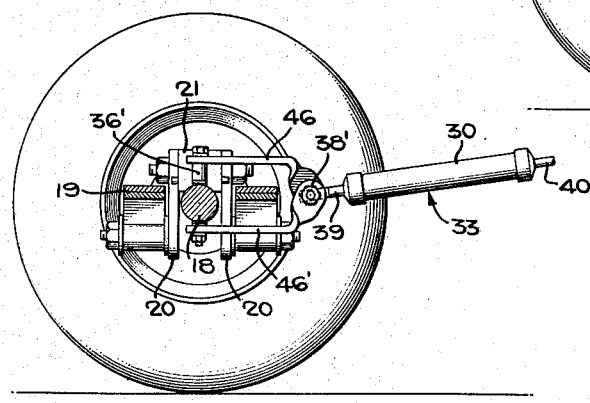
INVENTOR.
Leo C. Hagg
BY
ATTORNEY Aug. 22, 1950  L. C. HAGG  2,519,564
TRAILER DOLLY
Filed Oct. 20, 1947  3 Sheets-Sheet 3
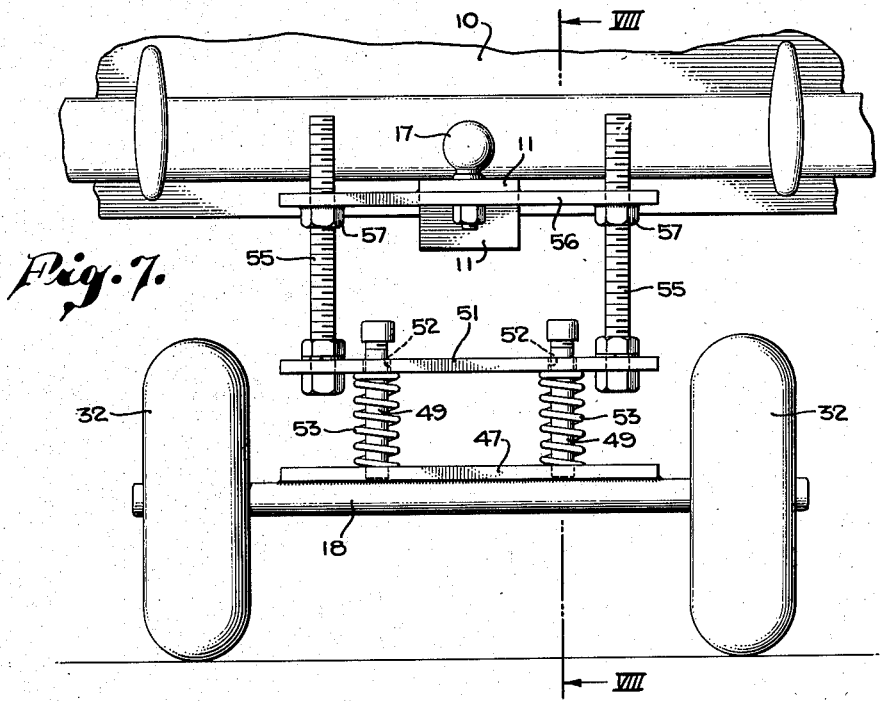
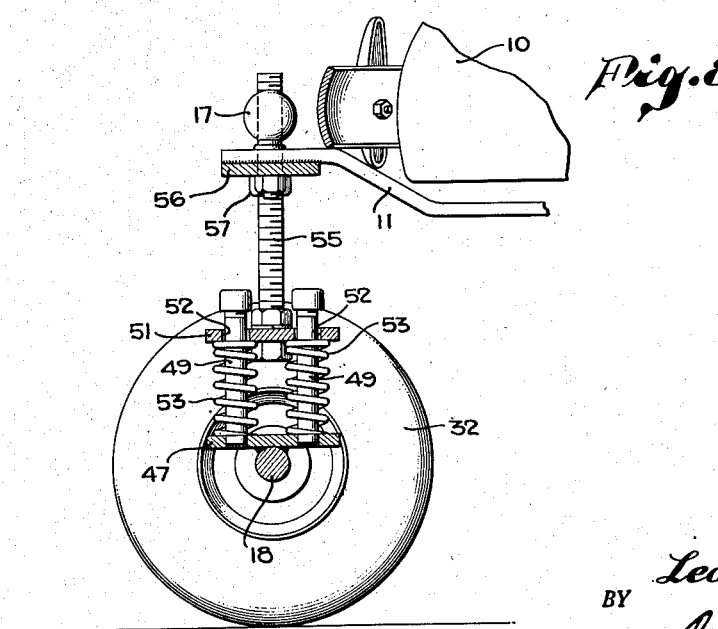
INVENTOR.
Leo C. Hagg
BY
ATTORNEY Patented Aug. 22, 1950

2,519,564

UNITED STATES PATENT OFFICE 2,519,564

TRAILER DOLLY

Leo Charles Hagg, Kenewick, Wash.

Application October 20, 1947, Serial No. 780,919

2 Claims. (Cl. 280—33.4)

This invention relates to a mechanical dolly and particularly to a dolly for use between a towing automobile and a trailer.

Trailers are generally connected to the towing automobile or car by means of a tongue which employs a form of universal or semiuniversal joint for connection with the car hitch, the latter usually being connected to the frame on the aft part of the car. Most trailers are mounted upon a single axle with wheels and those that employ two axles do not balance the trailer. A considerable proportion of the weight of the trailer must be carried by the towing car. The lack of balance exerts considerable stress on the frame of the car and on the structure of the trailer, which results in frequent repairs, and aside from the frequent repairs, considerable annoyance is experienced by the jerk of the trailer when it is unbalanced relative to the car. Often it is necessary to supply the towing car with overload springs in order to absorb the stresses of the trailer, particularly when heavy trailers are required. It is highly desirable, when towing a trailer, that the floor or body of the trailer be maintained in a horizontal plane. It is necessary, in order to accomplish this objective, to be able to raise or lower the tongue of the trailer. The present invention not only provides a dolly beneath the tongue of the trailer (between the towing car and the trailer) whereby the downward load of the trailer is absorbed (in part, at least) whereby the automobile used for towing is relieved of the excessive load, but in addition, this invention provides means whereby the vertical position of the tongue may be selectively established at any desired level, thereby permitting the tow car to pull the trailer with the latter at the most efficient level or balance point for effective, smooth towing.

Also, considerable difficulty is experienced when backing a trailer hitched onto a towing car. Naturally, when the trailer is connected directly to a hitch fixed to the frame of a towing car, the trailer has a tendency to go in the opposite direction than the towing car when backing. Still further, when the towing car is encumbered with considerable weight of the trailer, there is an inclination for the connection between the towing car and the trailer to jacknife, which imposes strain on the frames of both the trailer and the towing car.

It is one object of this invention to provide a dolly for use with trailers that will reduce the shock between the towing car and the trailer.

Another object is to provide a dolly for trailers that will relieve the towing car of excessive weight of the trailer and provide means whereby smooth and straight pull is obtained therebetween.

Another object is to provide a dolly for use with trailers wherein the dolly is connected to the towing car in such a manner as to operate independently of the main hitch between the towing car and the trailer.

A further object is to provide a dolly for use with trailers which will obviate props or jacks when parking a trailer independently of the towing car.

A still further object is to provide a dolly having the above characteristics that may be readily applied to the construction of the conventional connection heretofore provided between the trailer and the towing car.

A still further object is to provide a dolly of a type that may be readily adjusted for taking any desired amount of the weight of a trailer off of a towing car and be readily adjustable for any load condition that may arise.

Other objects will be made apparent throughout the further description of the invention when taken in connection with the accompanying drawings, some of which will reside in the simplicity, ruggedness, agility and synchronism of the dolly in connection with the inherent operation of the turning movements of both the towing car and the trailer. It is to be understood that the drawings are illustrative of exemplary forms which will enable one skilled in the art to produce a structure embodying the invention. While various modifications may be illustrated, the embodiments here shown are merely some of the preferred structures.

In the drawings:

Fig. 1 is a top plan view of a device embodying the invention shown connected between fragmentary sections of a trailer and a towing car.

Fig. 2 is a sectional view taken along the line II—II of Fig. 1.

Fig. 3 is a sectional view taken along the line III—III of Fig. 1.

Fig. 4 is a sectional view taken along line IV—IV of Fig. 3.

Fig. 5 is a fragmentary sectional view illustrating a different means for connecting the dolly to the riser jack carried by the trailer tongue.

Fig. 6 is a fragmentary sectional view illustrating a different means for connecting the axle of the dolly with a cross bar carried by the towing car.

Fig. 7 is a view similar to Fig. 2 illustrating another embodiment of the invention.

Fig. 8 is a sectional view taken along the line VIII—VIII of Fig. 7.

Referring to the drawings, 10 indicates a towing vehicle, such as an automobile or a truck, having fixed to the aft end of the frame a hitch 11 arranged to be connected with a tongue, represented in its entirety by 12, of a house trailer or a vehicle 13 to be towed. The tongue or draw bar 12 of the trailer 13 usually consists of a V- shaped member comprising legs 14 and 15, the apex of which may be provided with a socket 16 arranged to engage a hitch ball 17 carried by the aft end of the car hitch 11. The car hitch 11, tongue 12 and the hitch ball and socket 17 and 16, respectively, may be of any conventional type. Usually adjacent the socket 16 the tongue is provided with a riser jack or adjustable foot for the purpose of supporting the tongue 12 in a substantially horizontal position when the trailer is disengaged from the tow car and parked.

The present invention may be readily adapted for use with the connection above described and is arranged to operate independently of the conventional connection between the trailer and the towing car. In the form shown, there is provided an axle 18 mounted on suitable pneumatic wheels 32, preferably employing Timken bearings, or of such type which will permit long usage without lubrication. In the embodiment shown in Figs. 1 to 4, inclusive, there is mounted on each side of the axle 18 a pair of leaf springs 19, the ends of which are pivoted to shackles 20, the shackles 20 being mounted on suitable brackets 21 carried by the axle 18 and adjacent the corresponding wheels 32.

Centrally of the springs there is provided a mounting plate 22, the latter being fixed to the springs 19 by means of U-shaped clamps as shown at 24. Carried by the mounting plate 22 is a supporting head 23; the latter may be cast integrally with the mounting plate 22. The head 23 is formed to provide a socket 25 to receive a ball joint 26. The ball 26 is retained within the socket 25 by means of a plate 27. Within the plate 27 is provided an elongated slot 28 which will permit a predetermined amount of transverse movement of the axle 18 while permitting free turning movement of the axle relative to the trailer. In other words, it is desired that the present device be designed so that it is drawn by the towing vehicle independently of the trailer. In order to accomplish this, there is provided the ball 26 which rests within the socket 25 and having a stub shaft extending upwardly, the end of which is provided with a socket 29 for receiving the lower end of a conventional rising jack 31.

In order that the present device may be independently drawn by the drawing car, there is provided a pair of draw rods or link connections, each of which may consist of a draw bar, represented in its entirety by 33. Each of the draw bars 33 consists of a centrally located cylindrical member 30 having closed ends. The ends of the cylindrical member are provided with axially aligned openings for receiving connecting rods 39 and 40. The adjacent ends of rods 39 and 40 are flanged to form seats for a pair of coil springs disposed around the rods 39 and 40 and within the cylindrical member 30. The ends of the member 30 provide opposing seats for the co-operating ends of the springs. The rods 39 and 40 are free to slide within the cylinder 30 against the tension of the springs.

The draw bars 33 are utilized to connect the axle 18 of the trailer with a cross bar 34 carried by the towing car. The cross bar 34 is preferably positioned parallel to the rear axle of the towing car and may be attached to the conventional car hitch 11, such as by welding or by the use of bolts and the like. There is, of course, a certain amount of vertical movement of the draw bars 33 with respect to the axle 18, and the draw bars 33 may be connected to the axle 18 by means of bolts 36, the latter being threaded into vertical openings in the axle 18. The bolts 36 may have bifurcated upper end portions for receiving the rear ends of rods 39 of the draw bar 33, the rods 39 being connected to the upper bifurcated ends of the bolts 36 by means of pins 38, whereby a turning movement in a vertical plane is permitted.

It has been found necessary that a certain resiliency be provided between the cross bar 34 and the axle 18. This is effected by the oppositely disposed springs carried by the rods 39 and 40, each acting separately to effect the required pull between the axle 18 and the cross bar 34. It can be seen from the drawings that the draw bars 33 may be adjusted by means of the threaded connections 39 on rods 40. It is important that these draw bars be equally adjusted so that the axle 18 of the dolly will run in parallel alignment with the rear axle of the drawing car. Various means, such as illustrated at 45, may be provided for connecting the forward end of the rod 40 to the cross bar 34. Such means must provide for pivotal connection between the cross bar 34 and the adjacent ends of the connecting rods 40. In order to provide for turnable movement, both in a horizontal and vertical plane, the means 45 may include a swivel joint 41 having a vertically extending stud 42 projecting upwardly through the cross bar 34. The swivel joints 41 are held in assembled relation with the cross bar 34 by means of internally threaded members 43, having an operating head 44. The head 44 may be of any design whereby an operator may grasp the same for readily attaching or detaching the present device to the cross bar 34.

Fig. 5 illustrates another manner in which the springs 19 of the dolly may be connected to the riser jack 31. In this form, the supporting head 23' may be separated from the supporting plate 22' and provided with a central, circular opening, together with vertically aligned openings positioned axially of the cylindrical recess 25'. The ball 26' is here affixed to the supporting plate 22' and the upper opening 29' is employed as a socket for receiving the lower end of the riser jack 31. The opening 28' may be elongated in order to permit relative movement of the axle 18 in a transverse plane. In this construction the supporting head 23' may consist of two parts bolted together as clearly shown by Fig. 5.

Fig. 6 illustrates another form by means of which the connecting rods 39 may be affixed to the axle 18. In the form shown by Fig. 6, each of the vertical bolts 36' carried by the shaft 18 is provided with a U-shaped member having legs 46 and 46'. The free ends of the legs 46 and 46' are carried by the upper and lower end, respectively, of the bolt 36'. The closed ends of the legs 46 and 46' of the U-shaped member may be pivoted together, and the free end of the rod 39 pivoted by a single connection as shown at 38'. In this form, the inner end of the rod 39 may be permitted to turn in a vertical plane at the point 38', while the legs 46 and 46' may turn in a horizontal plane about the bolt 36'.

Another form of the present device as illustrated in Figs. 7 and 8 may reside in providing a supporting plate 47 on the axle 18. The supporting plate 47 may be rigidly fixed thereto by welding and having spaced thereon two pair of vertical members 49 disposed on opposite sides of axle 18 and arranged to support a horizontal member 51. The member 51 may have disposed therein openings 52 through which the vertical members 49 extend and are slidably connected therewith. Springs 53 may be disposed about member 49 and interposed between the supporting members 47 and 51 for absorbing the usual shock that occurs in normal operation.

In this embodiment, there is provided vertical threaded members 55, preferably disposed adjacent the ends of the supporting member 51 and arranged to adjustably support a supporting plate 56, suitable threaded means 57 being provided for adjusting the height of the supporting plate 56. In this latter embodiment the dolly may be positioned directly under the hitch ball 17. In fact, in this embodiment it is desired that the hitch ball 17 be carried by the car hitch directly above the supporting plate 56 to which the socket 16 of the tongue 12 is connected.

In the embodiments illustrated in Figs. 1 to 6 inclusive, it is important that the draw bars 33 be properly aligned and adjusted by the means 39 in order that the cross bar 34 will be normally parallel to the axle 18 of the dolly. This will effect proper turning of the dolly relative to the rear axle of the towing car, whereby similar movement of the trailer is obtained.

It has been found that a dolly constructed of light weight, strong material may be utilized in connection with trailers of various lengths and weights. The present construction does not only reduce the shock due to change of speed but it operates to prevent side swaying of the trailer and, consequently, saves wear and tear on the tires.

It will be obvious from the above description that the present device may be readily adapted to the conventional hitch between any towing vehicle and a vehicle to be towed. Many of the heavier types of trailers exert considerable pressure on the aft end of the towing vehicle and because of the weight on the aft end of the towing car it is oftentimes necessary to provide additional springs to compensate for this additional weight. By the use of the present device, the addition of extra springs is obviated. Aside from the smooth, straight pull produced between the pulling car and the trailer, it might be also well to mention that the present device obviates the use of props or jacks when parking a trailer. It will also be noted that the present dolly operates independently of the car hitch and that the dolly may be raised and lowered to provide any desired weight on the aft end of a towing vehicle.

The present device is readily adapted to most of the conventional trailer and car hitches without any alteration to the mechanism.

Accordingly, there is provided a mechanical dolly for use in absorbing the stresses between a towing car and a trailer which will prevent the undesirable jerks and stresses usually experienced and provide smooth, straight pull even on irregular roads or terrains. The present device does not only reduce the shocks between the towing car and the vehicle being towed but prolongs the mechanical life of both vehicles and provides an intermediate assembly which aids in the maneuvering of a vehicle being towed, since the drawbar carried by the drawing car is arranged to be substantially parallel to the axle of the dolly and independently connected to the drawing car without aid from the conventional connection of the car hitch and the tongue of a vehicle to be drawn.

While I have illustrated and described the present invention in connection with a drawing car and a car to be drawn, it will be obvious to those skilled in the art that the present dolly may be employed in numerous mechanical devices where there is relative movement between two moving objects. Other changes, additions and omissions may be made in the exemplary forms shown without departing from the spirit and scope of the invention.

I claim:

1. A trailer dolly for house trailers provided with a tongue extending forwardly beyond the trailer and a hitch carried thereby and attachable to a draw bar of a drawing vehicle, comprising: a wheel axle provided with a pair of spaced wheels adapted to extend beneath the tongue; a pair of parallel leaf springs, one on each side of the axle, the ends of each of said springs being pivotally connected to the wheel axle below the plane of the axle and the midpoints of said springs being above the plane of the axle; a mounting plate connecting the leaf springs midway of the wheels and above the axle; a vertically adjustable riser jack carried by the tongue adjacent the hitch; and a rotatable connection between said jack and mounting plate, whereby height of the tongue and the load carried by the dolly may be varied by adjustment of the riser jack.

2. A trailer dolly for house trailers provided with a tongue extending forwardly beyond the trailer and a hitch carried thereby and attachable to a draw bar of a drawing vehicle, comprising: a wheel axle provided with a pair of spaced wheels adapted to extend beneath the tongue; a pair of parallel leaf springs, one on each side of the axle, the ends of each of said springs being pivotally connected to the wheel axle below the plane of the axle and the midpoints of said springs being above the plane of the axle; a mounting plate connecting the leaf springs midway of the wheels and above the axle; a vertically adjustable riser jack carried by the tongue adjacent the hitch; a rotatable connection between said jack and mounting plate, whereby height of the tongue and the load carried by the dolly may be varied by adjustment of the riser jack; and a pair of spring-biased, parallel, link connectors pivotally attached to the axle and extending at right angles thereto, the forward end of each of said spring-biased link connectors being provided with means for adjusting the length thereof and means for connecting the same to a drawing vehicle, whereby said dolly may be drawn independently of the house trailer.

LEO CHARLES HAGG.

REFERENCES CITED

The following references are of record in the file of this patent:

UNITED STATES PATENTS

| Number | Name | Date |
|---|---|---|
| 355,341 | Saladee | Jan. 4, 1887 |
| 1,325,162 | McGriff | Dec. 16, 1919 |
| 1,490,093 | Coplantz | Apr. 15, 1924 |
| 1,773,313 | Lundelius | Aug. 19, 1930 |
| 2,189,170 | Gaussion | Feb. 6, 1940 |
| 2,302,246 | Nelson | Nov. 17, 1942 |
| 2,331,006 | Suttles | Oct. 5, 1943 |
| 2,376,001 | Nogle | May 15, 1945 |
| 2,378,297 | Hetzler | June 12, 1945 |
| 2,410,241 | Schramm | Oct. 29, 1946 |
| 2,463,926 | Ward | Mar. 8, 1949 |